UNITED STATES PATENT OFFICE.

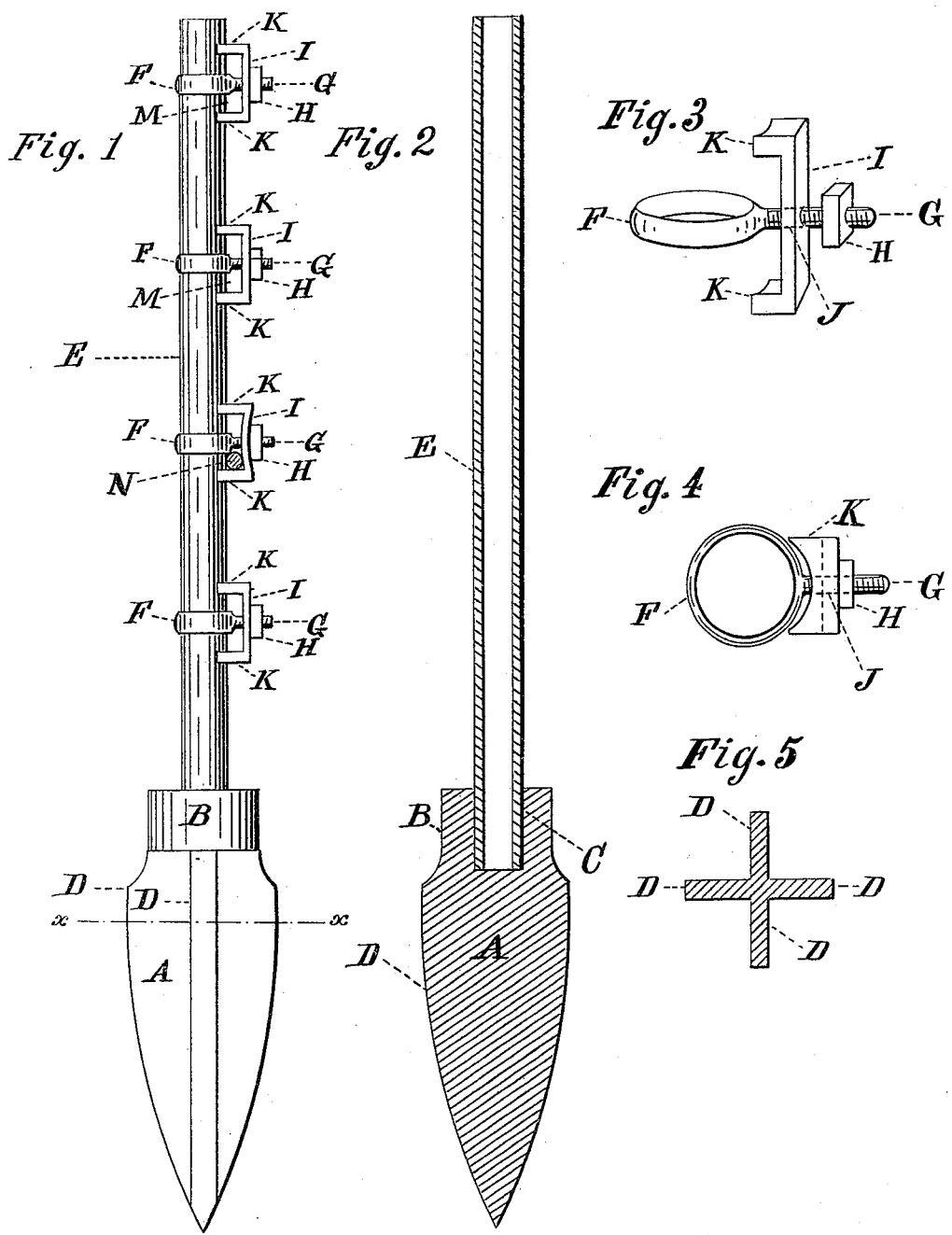

GEORGE TICKNOR AND ORSON BEBEE, OF PERRYSBURG, NEW YORK.

WIRE-FENCE POST.

SPECIFICATION forming part of Letters Patent No. 234,440, dated November 16, 1880.

Application filed September 9, 1880. (No model.)

*To all whom it may concern:*

Be it known that we, GEORGE TICKNOR and ORSON BEBEE, both citizens of the United States, residing in Perrysburg, in the county of Cattaraugus and State of New York, have invented certain new and useful Improvements in Wire-Fence Posts, of which the following is a specification.

The object of our invention is to produce a cheap and durable wire-fence post, to which the wire may be readily attached and securely held in place or easily detached when necessary; and it consists of a fence-post having a series of adjustable fastening devices, as will be more clearly hereinafter shown by reference to the drawings, in which—

Figure 1 represents a side elevation of the post complete. Fig. 2 is a vertical central section through the post and base. Fig. 3 represents an enlarged perspective view of one of the wire-holding devices. Fig. 4 is an end view of the same; and Fig. 5 represents a horizontal section through line $x$ $x$, Fig. 1, showing the form of the ribs.

A is the base of the post, or that portion which is driven into the ground. It is provided with a short cylindrical portion, B, (see Fig. 2,) having a hole, C, to receive the post, and is preferably made of cast-iron as being the cheapest and most durable material. It is in the form of a ribbed lance, having the upper outer edges, D, of the ribs project out farther than the periphery of the piece B, as in Fig. 1, thereby adapting it to be easily driven into the ground and to stand firmly when driven.

E represents the post, which is made of iron gas-pipe, thereby insuring sufficient strength and lightness; but, if desired, it may be made solid or of other materials.

The wire-fastening devices consist of the rings F, having a screw portion, G, projecting out from one side, and provided with a nut, H, which part passes through the part of the shackle marked I. (See dotted lines J in Figs. 3 and 4.) The shackle is formed with two parts, K K, arranged at right angles, or nearly so, to the part I, and curved inward to fit the post when forced against it by the nut G.

It will be seen that the shackles or wire-holders are adjustable vertically up or down on the post, and when the nuts H are loose they can be easily taken off or put on.

The wire is put in between the parts I K and the screw G through the opening M while the parts are loose, (see Fig. 1,) and is fastened by tightening the nuts, as at N, which shows a section through a piece of wire thus fastened.

The part I of the shackle is made of malleable iron or other similar material, and is thin enough to be flexible, so that the force of the nut screwed in place will cause it to bend or spring sufficiently to bind the wire closely and firmly against the post, as shown, and thereby hold it securely in place.

We claim as our invention—

A fence-post, E, provided with a suitable base, A, and a series of adjustable wire-holding devices, each consisting of a flexible shackle, I K K, and a ring, F, having a screw portion and a nut, as and for the purposes specified.

GEO. TICKNOR.
ORSON BEBEE.

Witnesses:
GEO. F. PARKER,
WM. BALL.